(12) United States Patent
Chiaro

(10) Patent No.: US 6,430,866 B1
(45) Date of Patent: Aug. 13, 2002

(54) FISHING HOOK FITTED WITH AN ARTIFICIAL BAIT

(76) Inventor: Vincenzo Chiaro, Via Trieste 3, 11027 Saint Vincent (Aosta) (IT)

( * ) Notice: Subject to any disclaimer, the term of this patent is extended or adjusted under 35 U.S.C. 154(b) by 0 days.

(21) Appl. No.: 09/600,181

(22) PCT Filed: Jun. 2, 1999

(86) PCT No.: PCT/EP99/03845
§ 371 (c)(1),
(2), (4) Date: Jul. 12, 2000

(87) PCT Pub. No.: WO99/65296
PCT Pub. Date: Dec. 23, 1999

(30) Foreign Application Priority Data

Jun. 12, 1998 (IT) ......................... TO98A0515

(51) Int. Cl.[7] .......................... A01K 85/08; A01K 83/00
(52) U.S. Cl. ..................... 43/42.25; 43/43.16
(58) Field of Search ............................ 43/43.16, 42.25, 43/42.26, 42.27

(56) References Cited

U.S. PATENT DOCUMENTS

| | | | | |
|---|---|---|---|---|
| 1,503,400 A | | 7/1924 | Web .............. | 43/42.5 |
| 1,750,243 A | | 3/1930 | Pflueger .............. | 43/42.4 |
| 2,757,476 A | * | 8/1956 | Pender .............. | 43/42.25 |
| 3,605,317 A | * | 9/1971 | Pobst .............. | 43/42.25 |
| 3,690,029 A | * | 9/1972 | Pobst .............. | 43/42.25 |
| 3,774,335 A | * | 11/1973 | Sisty .............. | 43/42.25 |
| 4,186,510 A | * | 2/1980 | Kimerer et al. .............. | 43/42.25 |
| 4,227,332 A | * | 10/1980 | Crofoot et al. .............. | 43/42.25 |
| 5,353,545 A | * | 10/1994 | Masetti .............. | 43/42.25 |
| 6,212,817 B1 | * | 4/2001 | Tanaka et al. .............. | 43/42.25 |

FOREIGN PATENT DOCUMENTS

| | | | | |
|---|---|---|---|---|
| DE | 3307604 | B1 | * 6/1984 | |
| FR | 932993 | B1 | * 4/1948 | .............. 43/42.25 |
| FR | 1029275 | B1 | * 6/1953 | .............. 43/42.25 |
| FR | 1296129 | B1 | * 5/1962 | .............. 43/42.25 |
| GB | 314034 | B1 | * 10/1929 | .............. 43/42.25 |
| GB | 1425212 | B1 | * 2/1976 | .............. 43/42.25 |
| JP | 5-95748 | B1 | * 4/1993 | |
| SU | 1344302 | B1 | * 10/1987 | .............. 43/43.16 |
| SU | 1556613 | B1 | * 4/1990 | .............. 43/43.16 |
| SU | 1717043 | B1 | * 3/1992 | .............. 43/43.16 |

OTHER PUBLICATIONS

Pennsylvania Angler, Chas. M. Wetzel, "Pet Trout Flies", Jan. 1939, pp. 2, 3, and 17.*

* cited by examiner

*Primary Examiner*—Darren W. Ark
(74) *Attorney, Agent, or Firm*—Renner, Otto, Boisselle & Sklar, LLP

(57) ABSTRACT

A fishing hook fitted with an artificial bait (or fly) and comprising a stem (2) having one end bent to form an eyelet (3), a connecting or intermediate section (4), a tip (5) and a fly body (7), at least a pair of feathers (8) simulating the fly wings, a plurality of fibers (10) simulating the fly tail, a plurality of fibers (9) simulating the fly legs, with the connecting section (4) being straight and perpendicular to both said stem (2) and tip (5).

6 Claims, 1 Drawing Sheet

FISHING HOOK FITTED WITH AN ARTIFICIAL BAIT

The present invention concerns a fishing assembly comprising a hook equipped with an artificial or man-made bait, known as fly or dun.

More particularly, the invention relates to a fishing hook fitted with an artificial bait simulating an insect for fly-fishing.

Fishing hooks fitted with an artificial bait are generally formed by "assembling" around a metal hook a copy as faithful (accurate) as possible, of an insect, mollusk or other small animal constituting the usual feed of the fish being fished.

Such assembly is built by winding round a metal hook, yarns, feathers and others suitable materials, with the two-fold purpose of hiding the hook from the fish and of mimicking the bait animal down to the smallest details.

There are known several types of hooks and artificial baits or flies for the different fishing techniques, such assembly being further different in respect of the kind of fish one is going to catch.

Artificial baits or flies fall into two groups, i.e. sub-merged baits and floating baits.

The former baits are kept at a depth from a few centimeters to a few decimeters below the water level, whereas the latter baits must appear as laying on the water surface, like insects ready to fly off.

The present invention is concerned with this latter type of bait.

There are known floating baits comprising hooks provided with a rear extension and known as: "elongated body" hooks.

On the hook extension there is wound a thread mimicking the shape of the insect body.

A first drawback of the hooks according to the prior art is that the hook weight is generally excessive and impairs the insect buoyancy.

As a matter of fact, to stay afloat a hook with an extension requires the use of large-size "insects", that is with a wide surface resting over the water.

In case too small an insect is assembled around such hook, the bait will result in an unrealistic partially-submerged insect.

Therefore such hooks are rather unsuitable for catching small fishes.

A first object of the present invention is to provide a light weight and small size fishing hook, around which an artificial bait of any desired size (mimicking that of the fish feed) can be easily assembled.

A second object of the invention is to provide a hook fitted with an artificial bait having an improved buoyancy in respect of the prior art devices.

Another drawback of the hooks with artificial bait of the prior art derives from the fact that such hooks are often unbalanced and tend to tilt sideways above the water.

Namely the artificial baits are made of materials with a weight in the order of one or more milligrams and a slight unbalance can incline the hook sideways, so that the cast bait can lean sideways over the water or even capsize and partially sink in a short time, thus assuming a posture scarcely deceptive to the fish.

Another object of the present invention is therefore to provide a balanced hook-bait assembly capable to lie on the water surface with a correct floating posture and capable to float for a long time thanks to its lightness and to the arrangement of materials forming the assembly.

The above and other objects are accomplished through a fishing hook and artificial bait assembly according to the invention, as claimed in the attached claims.

The invention overcomes the above discussed drawbacks through a fishing hook with an artificial bait using a minimum amount of metal thus avoiding an excessive weight of the artificial bait, and further provides a large resting surface to the floating parts because of its shape, thus efficiently simulating an insect floating over the water.

Further features and advantages of the invention will become evident from the following description of a preferred embodiment thereof only given with illustrative and non-limiting purposes, in the attached drawings, in which.

Figure 1:
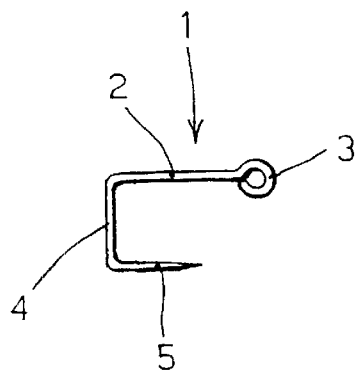
FIG. 1 is a side view of a hook in accordance with the invention.

Referring to FIG. 1, the fishing hook-bait assembly according to the invention comprises a hook 1 comprising a stem 2, bent at one end so as to form an eyelet 3 to be secured to the fishing line, a neck or intermediate section 4 and a tip (section) 5 that can be barbed or not.

Figure 2:
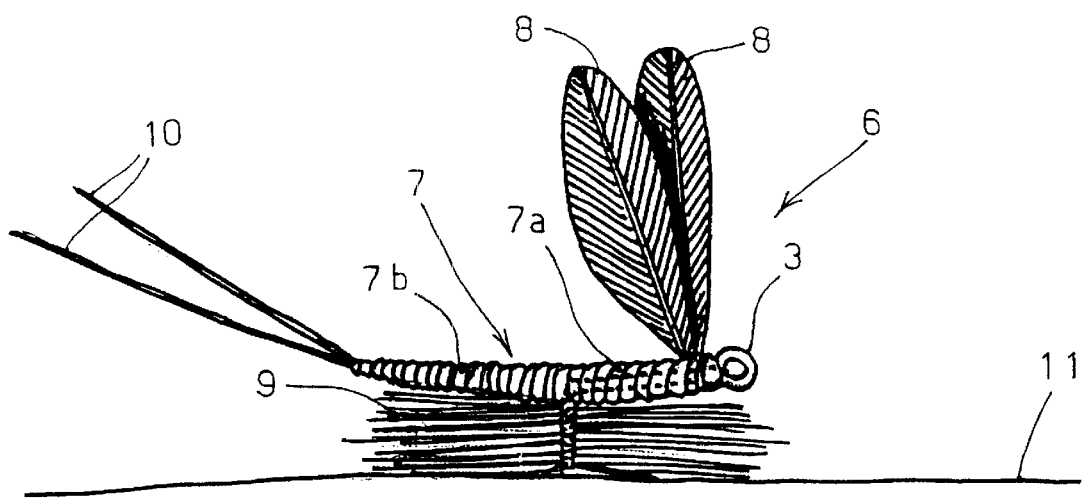
FIG. 2 is a side view of a hook-bait assembly in accordance with the invention.

FIG. 2 illustrates a fishing assembly according to the invention in which the artificial bait 6 is an imitation of a mayfly.

The artificial bait 6 comprises a body 7 formed by winding a yarn round the stem 2 of the assembly 1.

More particularly the body 7 comprises a front portion 7a wound round the stem 2, and a rear portion 7b formed by winding the yarn round a light support, such as a fiber, a synthetic feather, a splinter of wood, not illustrated in detail since they are known in the art.

The shape of the hook according to the invention advantageously allows for assembling "insects" of varying sizes and light weight.

On the body 7, near the end of the front portion 7a, there are fixed at least a pair of synthetic feathers 8 shaped like wings, and a plurality of fibers 10 for extending the rear portion 7 and simulating the insect tails.

The bait is completed by a plurality of fibers 9 secured around the intermediate section 4 of the hook 1 and extending radially from the intermediate section so as to define on the whole a rest surface over the waterline 11, simulating the insect legs.

Referring again to FIG. 1, the intermediate portion 4 is advantageously rectilinear and substantially orthogonal to the stem 2 instead of being arcuated as in conventional hooks.

In this respect it is pointed out that hooks with a so curved intermediate portion do not allow a parallel arrangement of the fibers, so that the resting surface over the waterline would not flat and uniform.

More precisely, in curved hooks the fibers wound round the intermediate portion take on a disorderly and sparse arrangement, and since the fibers are not parallel to one another, they penetrate the water surface and reduce the bait buoyancy.

On the contrary, according to the invention, the straight intermediate rectilinear section 4 is substantially perpendicular to the stem 2 of the hook.

Thanks to this arrangement the fibers 9 can be secured in a position substantially parallel to one another so as to define a plurality of parallel rest planes over the water surface 11, that improves the buoyancy of the hook-bait assembly.

Moreover, when the hook-bait assembly according to the invention is in the water, the rectilinear intermediate section 4 advantageously lies below the body 7, in a position substantially perpendicular to the water surface 11, thus imparting stability and a proper floating posture to the bait 6.

Finally also the tip (section) 5 is substantially perpendicular to the intermediate section 4, lies parallel to the water surface 11 and is perfectly disguised by the fibers 9.

Although the invention has been illustrated with particular reference to a preferred embodiment thereof, this latter is not to be construed as limiting the invention scope in which fall all the changes and modifications that will be evident to the skilled of the art.

What is claimed is:

1. A fishing hook and artificial bait assembly, comprising a stem having an end bent to form an eyelet, an intermediate section and a tip section, said intermediate section being substantially perpendicular to both said stem and tip section, and said intermediate section having fastened thereon a plurality of fibers that extend radially from said intermediate section so as to form a rest surface that is substantially parallel to the water surface so as to keep said assembly floating on the water surface.

2. A fishing assembly as claimed in claim 1, wherein said bait further comprises a body, at least a pair of feathers simulating fly wings and a plurality of fibers simulating a fly tail.

3. A fishing assembly as claimed in claim 2, characterized in that when said assembly is in water said intermediate section lies below said body, at a position substantially perpendicular to the water surface, and imparts to said bait stability and a proper floating posture.

4. A fishing assembly as claimed in claim 3, characterized in that when said assembly is in water the artificial bait is on the water surface.

5. A fishing assembly as claimed in claim 2, characterized in that when said assembly is in water the artificial bait is on the water surface.

6. A fishing assembly as claimed in claim 1, characterized in that when said assembly is in water the artificial bait is on the water surface.

* * * * *